United States Patent [19]

Fergason

[11] Patent Number: 5,523,863
[45] Date of Patent: *Jun. 4, 1996

[54] CONTROLLED LIQUID CRYSTAL OPTICAL POLARIZER METHOD AND APPARATUS

[76] Inventor: James L. Fergason, 92 Adam Way, Atherton, Calif. 94025

[*] Notice: The term of this patent shall not extend beyond the expiration date of Pat. No. 5,479,277.

[21] Appl. No.: 381,012

[22] Filed: Jan. 30, 1995

Related U.S. Application Data

[63] Continuation of Ser. No. 19,990, Feb. 17, 1993, abandoned, which is a continuation of Ser. No. 893,901, Jun. 4, 1992, abandoned, which is a continuation of Ser. No. 727,379, Jul. 5, 1991, abandoned, which is a continuation of Ser. No. 588,486, Sep. 26, 1990, abandoned, which is a continuation of Ser. No. 259,951, Oct. 19, 1988, abandoned.

[51] Int. Cl.⁶ .................................................. G02F 1/13
[52] U.S. Cl. .............................. 359/52; 359/37; 359/51; 252/299.1; 252/299.7
[58] Field of Search ............................... 350/349, 350 R; 252/299.1, 299.7; 156/244.12, 494, 495; 359/37, 51, 52; 351/49

[56] References Cited

U.S. PATENT DOCUMENTS

| | | |
|---|---|---|
| 3,833,287 | 9/1974 | Taylor et al. . |
| 4,048,358 | 9/1977 | Shanks . |
| 4,071,912 | 2/1978 | Budmiges . |
| 4,182,700 | 1/1980 | Benton et al. . |
| 4,190,330 | 2/1980 | Berreman . |
| 4,202,601 | 5/1980 | Burbo et al. . |
| 4,264,154 | 4/1981 | Petersen . |
| 4,279,474 | 7/1981 | Belgorod . |
| 4,416,514 | 7/1981 | Plummer . |
| 4,435,047 | 3/1984 | Fergason ............................. 350/350 R |
| 4,556,289 | 12/1985 | Fergason ............................. 350/350 R |
| 4,560,239 | 12/1985 | Katz . |
| 4,579,423 | 4/1986 | Fergason .................................. 350/349 |
| 4,579,426 | 4/1986 | Onufry . |
| 4,591,233 | 5/1986 | Fergason . |
| 4,606,611 | 8/1986 | Fergason ............................. 350/350 R |
| 4,616,903 | 10/1986 | Fergason ............................. 350/350 R |
| 4,671,618 | 6/1987 | Wu et al. ............................ 350/350 R |
| 4,673,255 | 6/1987 | West et al. ......................... 350/350 R |
| 4,685,771 | 8/1987 | West et al. ......................... 350/350 R |
| 4,688,900 | 8/1987 | Doane et al. ....................... 350/350 R |
| 4,707,080 | 11/1987 | Fergason .................................. 350/349 |
| 4,756,605 | 7/1988 | Okada et al. . |
| 4,848,875 | 7/1989 | Baughman et al. . |
| 4,893,902 | 1/1990 | Baughman et al. . |
| 4,899,503 | 2/1990 | Baughman et al. . |
| 4,943,152 | 7/1990 | Whelen . |
| 4,968,127 | 11/1990 | Russell et al. . |
| 5,113,270 | 5/1992 | Fergason . |

FOREIGN PATENT DOCUMENTS

| | | |
|---|---|---|
| 2293188 | 12/1975 | France . |
| 2154268 | 9/1985 | United Kingdom . |
| 8100463 | 2/1981 | WIPO . |
| 8504262 | 9/1985 | WIPO . |
| 8701822 | 3/1987 | WIPO . |

OTHER PUBLICATIONS

Hackh's Chemicm Dictionary, 4th Ed, McGram–Hill Inl. 1969 p. 240.
Japanese Patent Abstract, V.9, N170, p. 373, Kazuhiko et al. 1985 "Polarizing Film and its Production".
Electronics, V. 58, N31, p. 24, 1985, "Welding mask Adjusts for All Levels of Light".
Molecular Crystal LC, V.63, pp. 19–44, 1981, Uchida et al., "Guest–Host Type Liquid Crystal Display".

Primary Examiner—Georgia Y. Epps
Assistant Examiner—Michael A. Papalas
Attorney, Agent, or Firm—Renner, Otto, Boisselle and Sklar

[57] ABSTRACT

A controllable liquid crystal polarizer has nematic liquid crystal and pleochroic dye in plural, parallel, elongate volumes in a sheet-like containment medium. Polarization effectiveness is variable as a function of electric field. A method of making the polarizer includes continuously forming a sheet-like film of a containment medium having a plurality of volumes of liquid crystal and pleochroic dye therein, and during curing of the film, stretching it to elongate the volumes.

25 Claims, 3 Drawing Sheets

CAST EMULSION

FIELD OFF

STRETCHED EMULSION

FIELD OFF

FIELD ON

CONTROLLED LIQUID CRYSTAL OPTICAL POLARIZER METHOD AND APPARATUS

This is a continuation of application Ser. No. 08/019,990 filed on Feb. 17, 1993 Continuation of U.S. Ser. No. 07/893,901, filed Jun. 4, 1992 which is a Continuation of U.S. Ser. No. 07/727,379, filed Jul. 5, 1991, which is a Continuation of U.S. Ser. No. 07/588,486, filed Sep. 26, 1990 which is a Continuation of U.S. Ser. No. 07/259,951, filed Oct. 19, 1988 all now abandoned.

TECHNICAL FIELD

The present invention relates generally, as indicated, to a variable polarizer and, more particularly, to a liquid crystal optical polarizer. The invention also relates to a method of affecting polarization of light and apparatus for the same, as well as a method and apparatus for making a variable polarizer.

BACKGROUND

As is well known, unpolarized light is comprised of light in which the electric vector is randomly oriented; the direction of the electric vector is orthogonal to the direction of propagation of the light. Plane polarized light or linearly polarized light is light in which the electric vector generally is oriented in a single plane. Various means have been used in the past to polarize light, especially to convert unpolarized light to linearly polarized light.

Most, if not all, prior art polarizers provide a fixed amount of polarization. It would be desirable to be able to control polarization of light, i.e., to determine whether light emanating from a polarizer device in response to incident unpolarized light in fact is polarized or unpolarized and if polarized, to what extent polarized. The invention as described further below provides such capability.

The combination of liquid crystal material, for example, nematic liquid crystal or operationally nematic liquid crystal, in a containment medium and methods of making the same are disclosed in U.S. Pat. Nos. 4,435,047, 4,606,611, 4,591,233, 4,707,080 and 4,616,903. In several embodiments disclosed in a number of such patents, pleochroic dye is included in the liquid crystal volumes bounded by the containment medium. In operation, as a function of whether or not the prescribed input is applied, light either is transmitted or light is scattered or absorbed. Absorption primarily is due to the absorption characteristics of the dye; scattering primarily is due to index of refraction considerations.

In U.S. Pat. No. 4,556,289 a combination of liquid crystal and pleochroic dye in volumes formed in a containment medium is disclosed. The liquid crystal has low birefringence characteristics, and the index of refraction thereof is closely matched with that of the containment medium. Therefore, as a function of whether or not a prescribed input is applied, the intensity of light transmitted therethrough can be varied without substantially altering the image characteristics.

The devices disclosed in the above patents are operative substantially independently of optical polarization.

In U.S. Pat. Nos. 4,385,806, 4,436,376, 4,540,243 and Re. 32,521 a surface mode switching technique for liquid crystal to control light in response to electric field applied to liquid crystal is disclosed. Other devices which act as a wave guide to reorient the direction of optical polarization of light are known as twisted nematic liquid crystal devices.

A liquid crystal polarizer is disclosed in U.S. Pat. No. 4,048,358. Such polarizer includes an open micropore structure in a polypropylene sheet with liquid crystal material and dichroic dye in the pores. The pores tend to align the liquid crystal along the axis of the pores.

In U.S. Pat. Nos. 4,688,900, 4,685,771, 4,671,618 and 4,673,255 are disclosed liquid crystal devices in which volumes of liquid crystal material are formed in a containment medium. The patents disclose formation of such volumes of such liquid crystal material by condensation or spontaneous formation techniques. Application of stress to deform the volumes to form a polarizer and index of refraction considerations also are disclosed. Further, a switchable polarizer is mentioned in U.S. Pat. No. 4,688,900.

The entire disclosures of the above patents hereby are incorporated by reference.

SUMMARY

According to one aspect of the invention, a method of making a liquid crystal material polarizer includes casting an emulsion of liquid crystal material with pleochroic dye in a containment medium, and stretching such cast material to form elongate volumes of liquid crystal and pleochroic dye in such containment medium.

According to another aspect, a liquid crystal polarizer is made by the process of casting an emulsion of liquid crystal material and pleochroic dye in a containment medium, and stretching such cast material to form elongate volumes of liquid crystal material and pleochroic dye in such containment medium.

According to still another aspect, an article of manufacture includes a liquid crystal material, a containment medium for containing the liquid crystal material, the containment medium having elongate volumes for containing therein the liquid crystal material and for tending to align the liquid crystal structure by surface interaction generally in parallel with the direction of elongation of the volumes, and means in the liquid crystal material and responsive to the structural alignment thereof for affecting polarization of light incident thereon.

According to a further aspect, a variable optical polarizer includes liquid crystal, a containment medium for containing the liquid crystal, means for affecting the structural alignment of the liquid crystal, the liquid crystal being responsive to a prescribed input to change such structural alignment, and means in the liquid crystal responsive to such structural alignment thereof for affecting polarization of light as a function of such alignment.

A further aspect relates to a liquid crystal polarizer, including a three-dimensional matrix formed by a containment medium having a plurality of elongate generally closed volumes therein, polarizing means for affecting polarization of light incident thereon as a function of the orientation of such polarizing means, and liquid crystal in the volumes for determining the alignment of the polarizing means thereby to determine the polarization affect of the polarizing means.

Even a further aspect relates to an apparatus for making a controllable polarizer, including means for casting a mix of liquid crystal, pleochroic dye and containment medium to form a film-like product, and means to stretch such film-like product prior to final curing thereof.

The foregoing and other objects, aspects, features and advantages of the invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed. It will be appreciated that the scope of the invention is to be determined by the scope of the claims.

DESCRIPTION OF THE PREFERRED EMBODIMENTS

Figure 1:
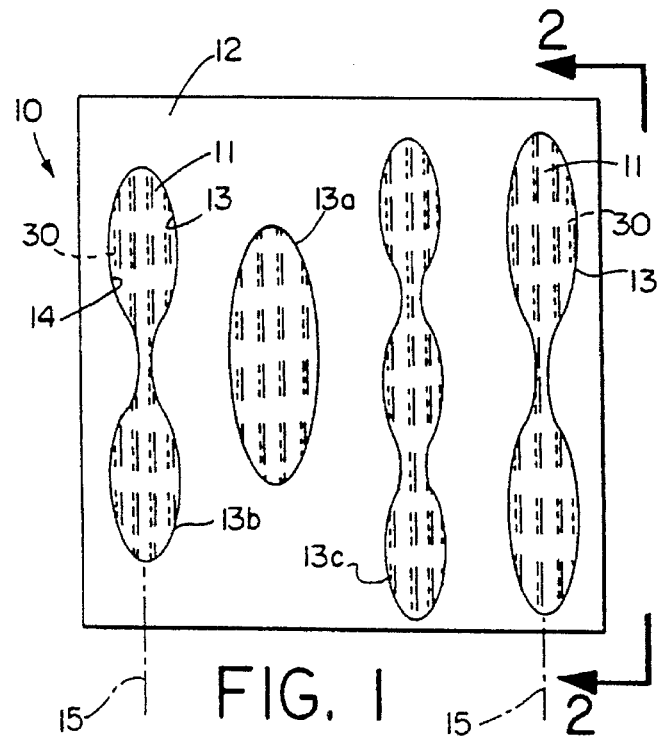
FIG. 1 is a schematic illustration of a controlled liquid crystal optical polarizer in accordance with the invention.
Figure 2:
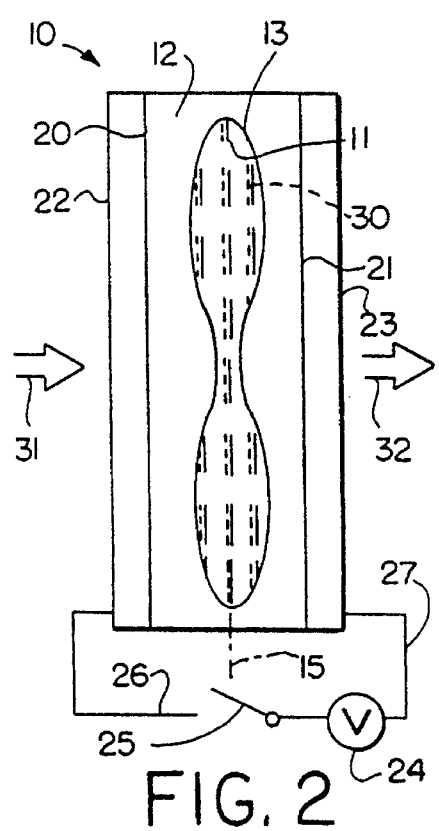
FIGS. 2 and 3 are schematic edge or end views of the polarizer of FIG. 1, in FIG. 2 the polarizer is not energized and in FIG. 3 the polarizer is energized by a prescribed input.

Referring in detail to the drawings, wherein like reference numerals designate like parts in the several figures, and initially to FIGS. 1 and 2, a controlled liquid crystal optical polarizer is generally designated 10. The polarizer 10 includes liquid crystal material 11 in a containment medium 12. More particularly, the liquid crystal material 11 is bounded by a wall 14 within the containment medium 12. The volume 13 preferably is an elongate volume and is operative by surface interaction with the liquid crystal material 11 to effect generally parallel alignment of the liquid crystal structure with respect to the major, and long or elongate axis 15 of the volume 13. Preferably, the length of the volume 13 is appreciably greater than the diameter or width of the volume, and preferably a number of the volumes are interconnected, e.g. , such interconnections being disclosed in several of the above-mentioned patents. The greater the aspect ratio of the volume, i.e., the ratio of length to diameter or width, the greater will be the generally linear alignment of the liquid crystal structure in the manner illustrated schematically in FIG. 1. Such linear structural alignment and parallel relation of such alignment to the axis 15 is depicted in FIG. 1 by the solid lines 11 representing liquid crystal structure in the volume 13.

As is illustrated in FIGS. 1 and 2, the containment medium 12 includes a plurality of the volumes 13 with liquid crystal 11 therein. The volumes may be singular ones, as is represented at 13a in FIG. 1, or when plural volumes have been interconnected and elongated there may be two, three or more elongate volumes in fluidic series relation, as is represented, respectively, for example, at 13b and 13c in FIG. 1. Moreover, although only four volumes are shown in the containment medium 12 in the controlled liquid crystal optical polarizer 10 of FIG. 1, it will be appreciated that the illustration in FIG. 1 is greatly magnified from the actual physical size of a controlled liquid crystal optical polarizer within which four such volumes would be included. Thus, in the area blocked out by the generally rectangular line circumscribing the controlled liquid crystal optical polarizer 10 in FIG. 1, there would be expected to be many more volumes 13 of liquid crystal 11. As an example, the larger diameter or width of such volumes, e.g., as is measured in the horizontal direction across a volume in FIG. 1, might be on the order of from about one-half micron to about seven microns; and the axial length of such volume along the axis 15 would be several times, as is illustrated about two to five times the diameter. However, while it is preferred that the elongation of the volumes be maximized, the invention would operate with smaller amount of elongation or aspect ratio or a larger amount of elongation or aspect ratio than that mentioned here.

The containment medium 12 preferably forms a three-dimensional matrix of the volumes 13, wherein the volumes effectively are closed to the environment externally of the containment medium 12. The volumes may be in a single layer or in multiple layers; in FIGS. 2 and 3, a single layer arrangement is illustrated for simplicity, whereas in FIGS. 4 and 6 multiple layers are illustrated, which more likely would be the case in a polarizer 10 according to the invention. Referring to FIG. 2, an edge view of the polarizer 10 is illustrated. The liquid crystal 11 is structurally aligned generally along the elongate axis 15 of the volume 13.

Preferably on the surfaces 20, 21 of the containment medium 12 there are respective electrodes 22, 23. At least one of the electrodes is optically transparent and, depending on use of the polarizer 10, possibly both electrodes are transparent. Alternatively, one of the electrodes may be nontransparent, for example, reflecting. Exemplary transparent electrodes may be formed of indium tin oxide, as is well known. Electrodes 22, 23 are used to apply a prescribed input, specifically an electric field, across the liquid crystal material 11. If the energy of such electric field is adequate to overcome the surface interaction of the wall 14 with the liquid crystal 11, the liquid crystal structure tends to align generally in parallel with such electric field in the manner illustrated in FIG. 3, for example. If the applied electric field is less than that necessary to obtain complete alignment in the manner illustrated in FIG. 3, then the liquid crystal structure would tend to be oriented at an angle that is not generally parallel to the axis 15 or to the direction of the electric field, i.e., the liquid crystal would be be partly oriented in the direction of the electric field but still would be partly oriented due to the described surface interaction. To accomplish the foregoing alignment characteristics with respect to electric field, it is necessary that the liquid crystal material 11 have positive dielectric anisotropy.

Figure 3:
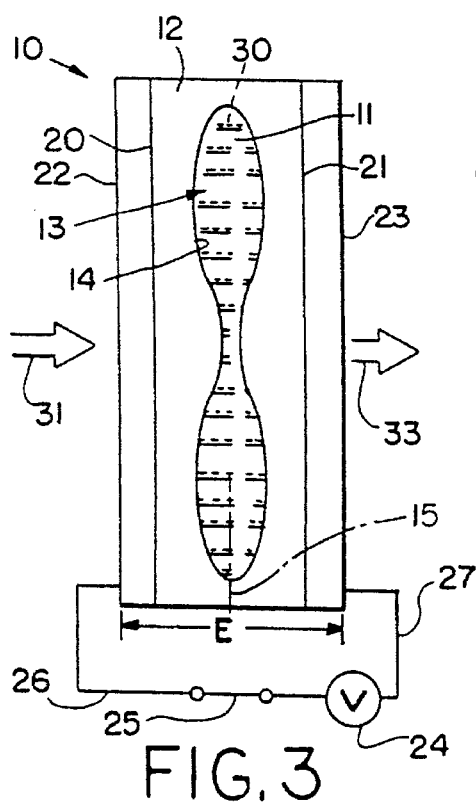

As is illustrated in FIGS. 2 and 3, a voltage source, either an AC source or a DC source, which is generally indicated at 24, is selectively connectable by a switch 25 and electric leads 26, 27 to the electrodes 22, 23 to cause application of electric field E across the liquid crystal. Operation of the liquid crystal to align in accordance with surface interaction and/or with respect to a prescribed input, such as an electric field, is disclosed in a number of the above-mentioned patents.

Included with the liquid crystal material 11 is pleochroic dye 30. The pleochroic dye, sometimes referred to as dichroic dye, may be neutral density or may have color characteristics. Importantly, though, the pleochroic dye 30 is operative to affect polarization of light incident thereon, as is described further below. Moreover, the pleochroic dye 30 has the characteristic to function in guest-host relationship with the liquid crystal material 11. Accordingly, the pleochroic dye, which has a structural orientation, is affected by the liquid crystal material 11 such that the structural orientation of the pleochroic dye will follow generally the structural orientation of the liquid crystal material 11. As is illustrated in FIGS. 1 and 2, the pleochroic dye 30 is aligned in parallel with the structure with the liquid crystal material 11 and, thus, in parallel with the axis 15; and as is seen in FIG. 3, the pleochroic dye is structurally aligned with the structure of the liquid crystal material orthogonally with respect to the axis 15. Although pleochroic dye is preferred, it will be appreciated that other means for affecting polarization of light as a function of orientation thereof and having a structural orientation that can be controlled by liquid crystal material may be utilized in accordance with the invention. Therefore, throughout the patent application it will be appreciated that reference to pleochroic dye includes reference to equivalent means for carrying out the polarization function of the described pleochroic dye.

Operation of the controlled liquid crystal optical polarizer 10 now is summarized. For this summary, the liquid crystal material 11, the containment medium 12, the electrodes 22, 23, and the pleochroic dye 30 are colorless. The liquid crystal material 11, containment medium 12, and electrodes 22, 23 are transparent. Assuming unpolarized light 31 is directed to be incident on the polarizer 10, as is illustrated 2, polarized light 32 exits the polarizer 10 when the liquid crystal and dye are structurally aligned in the manner illustrated in FIGS. 1 and 2. The direction of propagation of the incident light 31 is non-parallel with the axis 15, more particularly, such direction of propagation is shown as being generally orthogonal to the axis 15. The invention will function, however, even if the angle of propagation is other than orthogonal; but such angle should be non-parallel with respect to the axis 15, i.e., the direction of elongation of the volumes 13.

The pleochroic dye 30 tends to absorb that incident light of which the electric vector is vibrating in a plane that is parallel to the direction of the structural alignment of the pleochroic dye sometimes it is said that such electric vector is absorbed. In contrast, the electric vector of the incident light which is vibrating in a direction that is orthogonal to the alignment direction of the pleochroic dye will not be absorbed and, in fact, will be transmitted. Accordingly, the plane of polarization of the output light 32 would be in a direction that is orthogonal or perpendicular to the plane of the drawing of FIG. 2.

Preferably the pleochroic dye 30 does not absorb light that is incident thereon in a direction of propagation parallel to the axis or structure thereof. Therefore, as is illustrated in FIG. 3, the incident light 31, which is unpolarized, will be transmitted through the polarizer 10 and will exit as unpolarized light 33 since the structure of the liquid crystal material 11 and the pleochroic dye 30 are aligned generally in parallel with the direction of propagation of the light 31 through the polarizer 10.

In view of the foregoing, then, it will be appreciated that the polarization characteristics of the light 32, 33 exiting the polarizer 10 in response to incident light 31 will be a function of the alignment characteristics of the pleochroic dye 30 in the volumes 13. The light may be substantially linearly polarized, as light 32 when no electric field is applied across the liquid crystal material 11, may be substantially unpolarized as light 33 when an electric field adequate to achieve the alignment depicted in FIG. 3 is applied to the liquid crystal, and may be partially polarized when there is applied a mid-range electric field that is large enough to cause the liquid crystal (and pleochroic dye) structure to align out of parallel with the axis 15 but not quite fully in the orthogonally aligned relation illustrated in FIG. 3.

The liquid crystal material preferably is nematic liquid crystal or is operationally nematic liquid crystal Operationally nematic means that the liquid crystal material operates as nematic liquid crystal is expected to operate, e.g., nematic liquid crystal tends to have a usual structural alignment that is linear, this being the lowest free energy state thereof in the absence of some mechanism that alters such linear structure. A surface might tend to effect such alteration. Operationally nematic also is defined in several of the above patents, for example, as being a characteristic of liquid crystal such that in the absence of external fields, structural distortion of the liquid crystal is dominated by the orientation of the liquid crystal at its boundaries, for example, due to surface interaction, rather than by bulk effects, such as very strong twists (as is cholesteric liquid crystal material) or layering (as in smectic liquid crystal material). Also, it will be appreciated that use of various ingredients to affect liquid crystal operation such as use of a chiral ingredient which induces a tendency to twist but cannot overcome the effects of boundary alignment would still result in the liquid crystal being considered operationally nematic.

The liquid crystal material preferably is one in which the alignment characteristics thereof can be altered, thus, the preference for nematic liquid crystal in which alignment is affected by surface interaction, on the one hand, and/or by application of electric field, on the other hand.

Still further, as to the material of which the liquid crystal is formed, the same may be smectic liquid crystal or operationally smectic liquid crystal, the latter indicating that the liquid crystal tends to function as smectic liquid crystal would function. Smectic liquid crystal, though, tends to have a memory characteristic, vis-a-vis alignment thereof, and, therefore, it may be necessary when using smectic liquid crystal to apply not only an electric field generally in a direction orthogonal to the axis 15, e.g., as in FIG. 3, but also to apply an electric field in a direction generally parallel to the axis 15 to reset the liquid crystal structure to the configuration of FIG. 2 after the liquid crystal structure had been placed in the orientation of FIG. 3.

The liquid crystal material should be alignable along the major axis direction or elongation direction of the volumes 13, i.e., axis 15. Moreover, the liquid crystal material must be able to have its structural alignment changed from the alignment along axis 15 to another alignment, e.g., to the alignment orthogonal to the axis 15, as is shown in FIG. 3, as a function of a prescribed input. Such prescribed input may be an electric field, as is illustrated in detail in the drawings. Alternatively, such prescribed input may be a magnetic field that causes appropriate orientation of liquid crystal structure, as is well known. Still further, although less desirable, the prescribed input may be a thermal input; in such case, for example, the thermal input may raise the temperature of the liquid crystal material to cause the liquid crystal material to be in isotropic phase, thus losing the structural alignment characteristics thereof whereupon the pleochroic dye would tend to be in random orientation so that the exiting light from the polarizer 10 would tend to be unpolarized. In the latter case, cooling of the liquid crystal material would tend to cause the same to reobtain the structural alignment condition of a nematic phase, for example, so that the output light 32 would be linearly polarized again.

The liquid crystal material used in accordance with the invention could be any of the liquid crystal materials identified herein or other liquid crystal material, for example, those disclosed in the above-mentioned patents, that function and have the operational characteristics described herein.

The liquid crystal material preferably is transparent and has a low birefringence characteristic. More particularly, liquid crystal material is known to have both ordinary and extraordinary indices of refraction, and birefringence is the difference between such indices. In a low birefringence liquid crystal material, such indices of refraction are matched so as to be the same or nearly the same, i.e., the difference is relatively small. Moreover, preferably, the index of refraction of the containment medium 12 and the indices of refraction of the low birefringence liquid crystal material are matched or are substantially the same. More particularly, for optimum operation, the ordinary index of refraction of the liquid crystal material should be matched to the index of refraction of the containment medium or should be nearly matched thereto to minimize scattering of light when the liquid crystal material is in the presence of the prescribed input, e.g., the electric field, and is oriented in the manner illustrated in FIG. 3. As was noted, such characteristic tends to eliminate or at least to minimize scattering when the output light is intended to be unpolarized.

The invention also will function when the liquid crystal material is not a low birefringence material. In such case, the ordinary index of refraction should be matched to that of the containment medium so that unpolarized incident light 31 transmitted through the liquid crystal which is aligned generally in the direction of propagation, e.g., as in FIG. 3, will exit as unpolarized light 33 without substantial scattering. On the other hand, in the absence of the prescribed input, when the liquid crystal is oriented in the manner illustrated in FIG. 2, for example, although light will tend to be scattered due to a mismatch between the index of refraction of the liquid crystal and the index of refraction of the containment medium, nevertheless, the exiting light 32, including that which is scattered, has been found to be linearly polarized.

In the preferred embodiment the electrical response characteristics of the liquid crystal material should be such that it will align with respect to an applied electric field E. Liquid crystal material, especially that of the nematic type, is known to have two different dielectric coefficients, an ordinary dielectric coefficient and an extraordinary dielectric coefficient. Due to the difference in such dielectric coefficients, the liquid crystal material will tend to align with respect to an applied electric field. For known liquid crystal materials, the smaller the birefringence is, the smaller is the difference between the dielectric coefficients tends and be; on the other hand, it is desirable to provide an adequately large difference between the dielectric coefficients so that the liquid crystal structure will tend to orient with respect to an applied electric field, especially an electric field of reasonable magnitude, e.g., 40 volts or less, the smaller the better, although such magnitude is not intended to be limiting on the invention. Therefore, it will be appreciated that it will ordinarily not be possible for known liquid crystal materials to have zero birefringence, for there must be some birefringence in order to have adequate difference between dielectric coefficients to achieve the desired alignment.

The liquid crystal material preferably is an oil-base material that is able to form an emulsion with a water-base containment medium 12. Alternatively, the liquid crystal material may be soluble in the containment medium before and/or during manufacturing of the polarizer 10; but the liquid crystal material should not be soluble in the containment medium after the containment medium has set up as a solid or substantially solid material with the elongate volumes 13 therein. An example of formation of liquid crystal volumes in the containment medium, wherein the liquid crystal material is soluble in the liquid containment medium is disclosed in several of the above-mentioned patents.

Exemplary liquid crystal materials that are useful in accordance with the invention are dicyclohexanes and phenylcyclohexanes, these being preferred because they are relatively low birefringence materials, and the ordinary and extraordinary indices of refraction thereof are relatively low so as to facilitate matching with the index of refraction of the containment medium 12. Other exemplary materials are cyanobiphenyl materials and esters. Still further, liquid crystal materials that are disclosed in the above-mentioned patents also may be used in accordance with the present invention, as long as they provide the operational/functional characteristics described herein.

Other specific exemplary liquid crystal materials useful in accordance with the invention are those manufactured and/or sold by E. Merck and identified by the code numbers ZLI-1646, ZLI-2359, ZLI-1800, and ZLI-4119.

The containment medium 12 preferably forms a three dimensional matrix of volumes 13, as was mentioned above. Such containment medium has properties to form such matrix of elongate volumes to contain the liquid crystal material 11 and the pleochroic dye 30 therein, preferably without leakage. The material of which the containment medium 12 is formed is able to provide the surfaces or walls 14 which define the volumes 13 for the purpose of interacting with the liquid crystal to cause, to influence, or to affect alignment of the liquid crystal structure so as to be generally in parallel with the major axis 15 of the respective volumes.

The containment medium 12 preferably is a material that forms an emulsion with the liquid crystal material 11, which preferably is an oil base material; therefore, the containment medium 12 preferably is a water base material.

Alternatively, as is elsewhere mentioned herein the containment medium may be such that the liquid crystal material is soluble therein and is able to undergo curing such that the liquid crystal condenses out to form the volumes 13 thereof. This alternative is less preferred than the circumstance in which the liquid crystal is not soluble in the containment medium, for when the liquid crystal is so soluble, the pleochroic dye also tends to be soluble but does not condense out like the liquid crystal material does during curing of the containment medium. In such case other means or other pleochroic dyes than those conventionally available may be necessary to obtain the desired polarization effects of the invention.

According to the invention, the containment medium 12 with the liquid crystal and pleochroic dye therein should be able to be cast in a continuous process. Therefore, desirably, the containment medium and the liquid crystal material and pleochroic dye therein should have adequate viscosity, fluidity, and curing/set up characteristics to enable such casting.

Optically, the containment medium 12 should be transparent and should not be optically active. If desired, the containment medium may contain a color tinting material, such as non-pleochroic dye or other material. Additionally, the index of refraction of the containment medium should be the same as or at least close to the same as the ordinary index of refraction of the liquid crystal material.

Electrically, the impedance of the containment medium 12, especially including the liquid crystal material 11 and pleochroic dye 30 in volumes 13 therein, should be such that adequate electric field can be applied across the liquid crystal material to achieve the desired alignment thereof, e.g., as is illustrated in FIG. 3. Of course, if the prescribed input to the polarizer is magnetic field, the characteristics of the containment medium, liquid crystal material and pleochroic dye should be such that adequate magnetic field can be conveniently applied to the liquid crystal material to achieve the desired alignment with respect thereto.

The containment medium 12 should be a stable material. It should not degrade in physical integrity and should not discolor in response to ultraviolet light/radiation. If desired a separate ultraviolet radiation absorber may be employed to protect the containment medium 12, the pleochroic dye, and/or the liquid crystal material 11 from undesirable affects of ultraviolet radiation. The containment medium 12 should not chemically affect the liquid crystal material or pleochroic dye; and such liquid crystal material and pleochroic dye likewise should not chemically affect the containment medium.

In order to form the elongate volumes 13, as will be described elsewhere herein, it is desired to stretch a film formed of the emulsion of containment medium, liquid crystal and pleochroic dye, thus elongating the otherwise generally spherical volumes. To facilitate such stretching it is desirable that the film, particularly the containment medium 12, have elastic characteristics, thus being a viscoelastic material during the stage between casting thereof and final curing thereof. To provide such elasticity and also preferably to provide flexibility for the film during curing and after curing, it is desirable to add a plasticizer to the containment medium. An exemplary plasticizer is glycerine. Other plasticizers also may be used, such as ethylene glycol and propylene glycol. Other materials which are operable to plasticize the containment medium, e.g., polyvinyl alcohol containment medium or another of the containment media mentioned herein, which do not interact with the liquid crystal material, also may be used.

The volumes 13 in the containment medium preferably are arranged in a three dimensional matrix, i.e., they are arranged relative to each other in spaced apart relationship in all three orthogonal coordinate directions, x, y, z. The major axes 15 of such volumes should be parallel, as is illustrated in FIGS. 1–3. The volumes should have a relatively maximum elongation that is obtainable; generally the longer the better or the larger the aspect ratio the better. The diameter of the volumes at the widest part should be small enough that the liquid crystal structure in the volume tends to be organized preferentially in the direction of the major axis 15 when in the absence of a prescribed input, such as electric field E. Preferably the volumes are interconnected to maximize elongation and to minimize ends where relatively short radius of curvature would occur, while also minimizing lateral interconnections or cross components between volumes, i.e., in the direction orthogonal to the axis 15, where alignment other than in the direction of the axis 15 may tend to occur. In the preferred embodiment and best mode, the volumes 15 are generally tube-like or cylindrical; width diameter may be from about ½ micron to about 7 microns; aspect ration of length to diameter should be as great as possible. The dimensions mentioned herein are intended to be exemplary and not limiting.

One exemplary material for the containment medium is polyvinyl alcohol (PVA), e.g. such as the purified PVA mentioned in U.S. Pat. No. 4,435,047. Other materials include those mentioned in the several patents identified above. Still other containment include polyurethane, latex polyurethane, other latexes or water soluble polymers, resin, epoxy acrylic latex and so on. Most preferably the containment medium should be water soluble so it does not dissolve the liquid crystal and pleochroic dye, although this is not essential as long as volumes of liquid crystal and pleochroic dye according to the invention can be formed and can function as is described herein.

If desired a further support and/or protective structure of glass, plastic or other material may be provided to support and to protect the containment medium and volumes of pleochroic dye and liquid crystal material therein. For example, such glass may include plural sheets thereof between which is sandwiched the polarizer 10; the glass helping to prevent degradation of the pleochroic dye with time, certain radiation, etc.

Turning, now to the light polarizing material, e.g., the pleochroic dye 30, such material is operative to polarize light or to affect polarization of light in a controllable fashion to vary the extent or amount of such polarization. If the dye is fully aligned in one of the directions illustrated in FIGS. 2 or 3, then the output light 32 or 33 would be substantially linearly polarized or substantially unpolarized, respectively. If the dye is partly aligned with respect to the field E, then the output light would tend to have more polarization characteristic than the unpolarized light 33 of FIG. 3, but less polarization characteristic than the substantially fully linearly polarized light 32 of FIG. 2.

The material for affecting polarization 30 preferably is pleochroic dye, sometimes referred to as dichroic dye. Exemplary dyes are disclosed in a number of the above-identified patents and may be used herein. Preferably the pleochroic dye is colorless when the polarizer is concerned primarily with polarization control without concern with color; but if desired the dye may be such that it selectively absorbs and transmits certain respective colors, e.g., as a function of alignment thereof.

The pleochroic dye operates to linearly polarize light that is incident thereon. The incident direction is generally perpendicular to the plane in which the dye is aligned. The dye tends to absorb the electric vector of the incident light which vector is in the direction of the axis of the liquid crystal. Therefore, the plane of polarization of light transmitted by the dye is orthogonal to the axial direction of the dye. The dye tends not to polarize light that is incident on the dye in a direction along the axis of the dye. Moreover, as was described above, the dye is alignable in the same direction as the liquid crystal in guest-host relationship.

Figure 4:
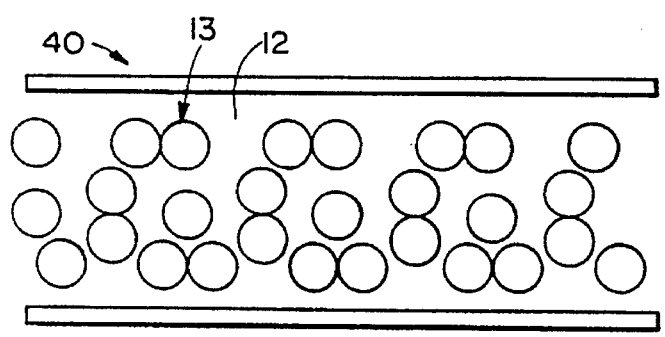
FIG. 4 is a schematic illustration of a cast emulsion to make a film-like material embodying the controlled liquid crystal optical polarizer of the invention.
Figure 5:
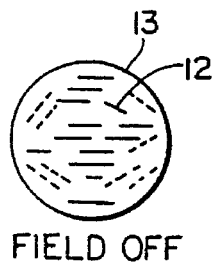
FIG. 5 is a schematic representation of one volume of liquid crystal material in the containment medium of which the cast emulsion of FIG. 4 is formed.

Turning, now, to FIGS. 4 and 5, a cast film of an emulsion of liquid crystal material and pleochroic dye in volumes 13 in a containment medium 12 is illustrated at 40. The film includes multiple layers of volumes 13 randomly distributed in the emulsion. The dark black lines at the top and bottom designate the limits of the containment medium surfaces. In FIG. 5 is illustrated a single exemplary liquid crystal volume 13 prior to stretching of the film 40. It can be seen that the volume 13 tends to be generally spherical and the liquid crystal material therein tends to be oriented at random. More particularly, as is described in U.S. Pat. No. 4,435,047 and others of the above-mentioned patents, such liquid crystal material would tend to be curvilinearly aligned in the absence of an electric field.

Figure 6:
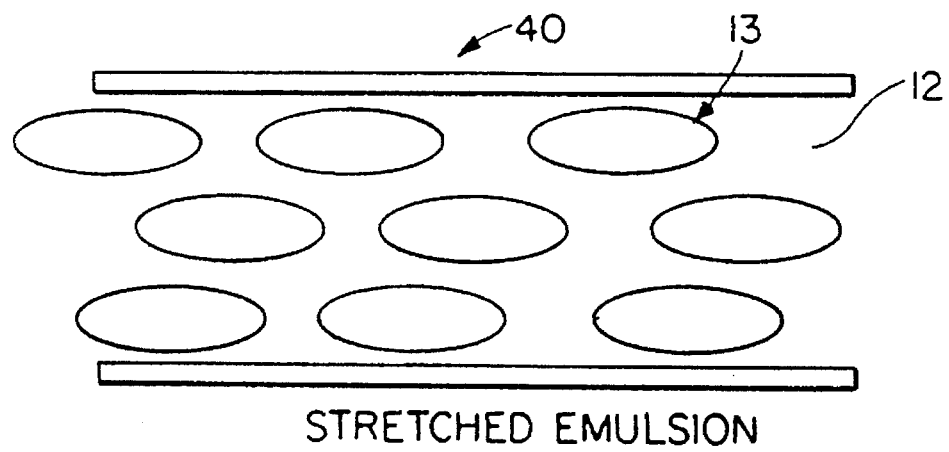
FIG. 6 is a schematic illustration of the cast emulsion film-like material of FIG. 4 stretched to form elongate volumes of liquid crystal therein.
Figure 7:
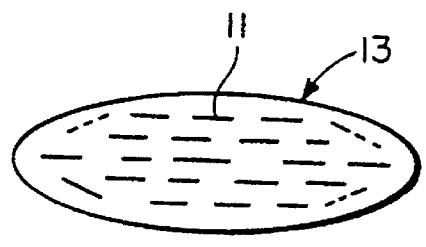
FIGS. 7 and 8 are schematic illustrations of an elongate volume of liquid crystal of the stretched emulsion film-like material of FIG. 6, respectively, in the absence of a prescribed input and in the presence of a prescribed input.
Figure 8:
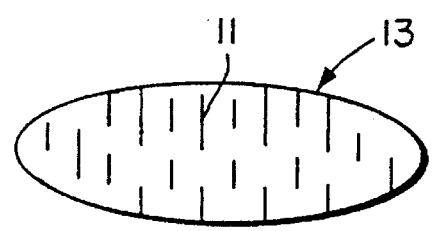

According to the invention, the cast emulsion film 40 is stretched, as is illustrated in FIGS. 6–8. The stretching preferably is uniaxial to cause the volumes 13 to become elongated in the manner illustrated in FIGS. 1–3 and 6–8. After satisfactory curing, solidifying, drying, etc., of the film 40, the film forms the variable polarizer 10 of the invention. Preferably electrodes 22, 23 would be added to the polarizer 10 to provide the desired prescribed input thereto, although such electrodes and/or the electric field may be supplied by another external device; and if the input is a magnetic field or thermal energy, the electrodes also would not be necessary for the polarizer 10.

In FIGS. 7 and 8 the alignment characteristics of the liquid crystal material 11 are illustrated. In FIG. 7 in the absence of the prescribed input, e.g., electric field E, the liquid crystal assumes a structural orientation along the direction of the elongate volumes 13. In the presence of the field depicted in FIG. 8, the liquid crystal structure aligns with the field and across the major axis of the volume 13. Such alignment and re-alignment are achieved due, respectively, to interaction with the surface of the volumes and to the electric field. The pleochroic dye 30 also would tend to align with the liquid crystal structure orientation, as was described above.

Figure 9:
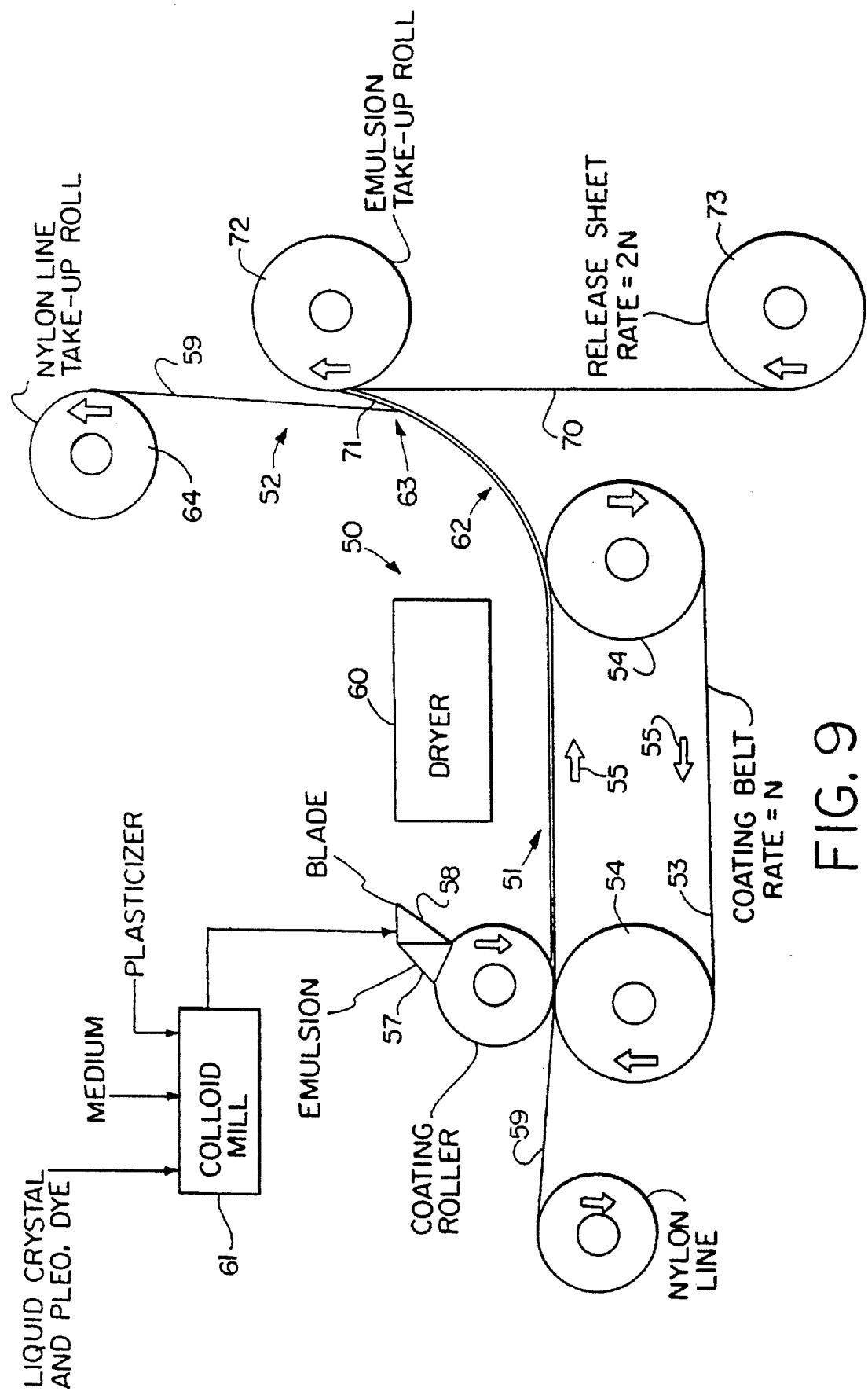
FIG. 9 is a schematic illustration of an apparatus for making in a continuous process a film-like material of a controlled liquid crystal optical polarizer in accordance with the invention.

Turning to FIG. 9, an apparatus and method for making the controlled liquid crystal optical polarizer 10 in accordance with the invention is depicted at 50. The apparatus 50 is in the form of a reverse roll casting machine 51 with a stretching device 52. The reverse roll casting machine 51 includes a cyclical conveyor belt or coating belt 53, which moves along rollers 54 powered by a conventional motor and controlled by conventional controls, e.g, as to speed, etc. The belt 53 moves in the direction of the arrows 55. The machine 51 also includes a coating roller 56, which rotates in the direction indicated to apply, to deposit, or to cast the emulsion 57 of containment medium 12, liquid crystal material 11, pleochroic dye 30 and plasticizer on the belt 53. A conventional blade 58 is provided to determine the thickness of the emulsion layer so deposited. A dryer 60 of conventional design is employed to dry the emulsion, e.g. drying out the water from the polyvinyl alcohol thereby to cure the emulsion to a film form that has adequate structural integrity so that it can be drawn up by the stretching apparatus 52 and stretched.

A colloid mill 61 is provided to form the emulsion of liquid crystal material, pleochroic dye, plasticizer, and containment medium and to deliver the emulsion 57 to the casting machine 50. Preferably such emulsion is continuously formed and the casting is performed as a continuous process; likewise, the stretching by the stretching apparatus 52 preferably is continuous. Means other than a colloid mill also may be used to form the emulsion 57. A source of nylon or other string-like substance 59 may be used to be drawn along with the emulsion on the belt 53. Such string may be used to draw the film up to the stretching apparatus 52, e.g., as is illustrated at 62. Thereafter, the film may be drawn by the stretch apparatus while the string is peeled from the film or is cut therefrom at the area 63, and the string is taken up by a take-up roll 64. Such string, therefore, preferably is located at one or at both edges of the film as it travels along the coating apparatus 50.

The stretch apparatus 52 includes a release sheet 70 of Mylar or other material that may be used to draw the film 71 onto an emulsion take-up roll 72 to cause stretching of the film and, thus, formation of the polarizer 10 with elongate volumes 13 of liquid crystal 11 in the containment medium 12. The release sheet is supplied from a first storage roll 73. The speed of travel of the release sheet should be greater than the speed of travel of the film at 71 thereby to cause the desired application of stress to the film and, thus, the desired stretching to cause the desired elongation of the volumes. An exemplary speed differential may be, for example, a factor of two; other differentials also may be employed. After the film 71 has been drawn onto the roll 72, it can later be rolled off such roll for use as a polarizer; the film then can be cut to a desired size; the release sheet 70 may be left adhering to the film or may be removed.

Summarizing the method of making the polarizer 10, the ingredients used to form the emulsion are mixed and are emulsified, i.e., the liquid crystal material, pleochroic dye, plasticizer and containment medium. The film 71 is formed by a continuous casting method. The film is cured by a heater 60 or other means (including natural curing without external energy, etc.) in any event to tend to retain its film-like form and shape. Such film then has plural volumes of liquid crystal and pleochroic dye formed in the containment medium. The volumes may be generally spherical in order to tend to achieve the lowest free energy state thereof. Thereafter, the film is stretched to elongate the volumes, thus causing linearizing of the liquid crystal structure and corresponding orientation of the pleochroic dye. (Since the film is stretched to elongate the volumes, it will be appreciated that whether the initial volume shape is generally spherical or is some other shape ordinarily would not be critical.) The material is allowed to cure finally to retain its shape with the elongate volumes therein. Subsequently electrodes may be applied, if desired and necessary.

EXAMPLE 1

A mixture of liquid crystal material ZLI-1646 of E. Merck (20%), glycerine (20%) and polyvinyl alcohol PVA-205 of Air Products & Chemicals (60%) (the polyvinyl alcohol having a concentration or 25%, the balance being water), was mixed and an emulsion was formed thereof. The liquid crystal material included blue pleochroic dye M-141 of Mitsui Chemicals in a concentration of less than 1% of the liquid crystal material. The emulsion was cast to form a film, and the film was stretched in the above-described manner.

EXAMPLE 2

A mixture of liquid crystal material ZLI-2359 of E. Merck (20%), glycerine (20%) and polyvinyl alcohol PVA-205 of Air Products & Chemicals (60%) (the polyvinyl alcohol having a concentration or 25%, the balance being water), was mixed and an emulsion was formed thereof. The liquid crystal material included blue pleochroic dye M-141 of Mitsui Chemicals in a concentration of less than 1% of the liquid crystal material. The emulsion was cast to form a film, and the film was stretched in the above-described manner.

EXAMPLE 3

A mixture of liquid crystal material ZLI-1800 of E. Merck (20%), glycerine (20%) and polyvinyl alcohol PVA-205 of Air Products & Chemicals (60%) (the polyvinyl alcohol having a concentration or 25%, the balance being water), was mixed and an emulsion was formed thereof. The liquid crystal material included blue pleochroic dye M-141 of Mitsui Chemicals in a concentration of less than 1% of the liquid crystal material. The emulsion was cast to form a film, and the film was stretched in the above-described manner.

EXAMPLE 4

A mixture of liquid crystal material ZLI-4119 of E. Merck (20%), glycerine (20%) and polyvinyl alcohol PVA-205 of Air Products & Chemicals (60%) (the polyvinyl alcohol having a concentration or 25%, the balance being water), was mixed and an emulsion was formed thereof. The liquid crystal material included blue pleochroic dye M-141 of Mitsui Chemicals in a concentration of less than 1% of the liquid crystal material. The emulsion was cast to form a film, and the film was stretched in the above-described manner.

Other examples would include varying the concentrations of the ingredients, e.g., such that the liquid crystal material may be increased in the range of from about 20% to about 30% and such that the plasticizer, e.g., glycerine, is varied in the range of from about 12% of the amount of the polyvinyl alcohol to about 25% of the amount of polyvinyl alcohol. Also, other concentrations of polyvinyl alcohol may be used.

It will be appreciated that the foregoing examples and description are only exemplary and are not intended to be limiting on the invention. Rather, the scope of the invention is intended to be defined by the following claims.

The embodiments of the invention in which an exclusive property or privilege is claimed are defined as follows:

1. A method of making a liquid crystal material polarizer comprising continuously casting an emulsion of liquid crystal material in a containment medium, and stretching such cast material to form elongate volumes of liquid crystal in such containment medium.

2. The method of claim 1 wherein said stretching comprises substantially unidirectional stretching.

3. The method of claim 1 further comprising selecting such liquid crystal as operationally nematic liquid crystal.

4. The method of claim 1 further comprising the step of forming an emulsion of liquid crystal and pleochroic dye with such containment medium to obtain volumes of liquid crystal and pleochroic dye in such containment medium.

5. The method of claim 1, further comprising curing said cast material to retain a generally elongate shape of volumes therein.

6. The method of claim 1, further comprising allowing such cast material to cure to retain a generally elongate shape of volumes therein.

7. The method of claim 1, further comprising selecting such liquid crystal material as low birefringence liquid crystal material.

8. The method of claim 7, wherein pleochroic dye is included with the liquid crystal, and said casting comprises casting an emulsion of liquid crystal, pleochroic dye and containment medium.

9. The method of claim 1, said casting comprising casting such emulsion of liquid crystal, and containment medium.

10. The method of claim 9, wherein pleochroic dye is included with the liquid crystal, and said casting comprises casting an emulsion of liquid crystal, pleochroic dye and containment medium.

11. The method of claim 1, further comprising final curing such cast material subsequent to said stretching step.

12. The method of claim 1, comprising selecting the liquid crystal material to respond to a prescribed input to change structural alignment for affecting polarization of light as a function of such alignment.

13. A liquid crystal polarizer made by the process of continuously casting an emulsion of liquid crystal material in a containment medium, and stretching such cast material to form elongate volumes of liquid crystal material in such containment medium.

14. The polarizer of claim 13, said casting comprising casting the emulsion using a reverse coating roller process.

15. The polarizer of claim 14, said stretching comprising substantially unidirectional stretching to form a three-dimensional matrix of such elongate volumes.

16. The polarizer of claim 14, further comprising selecting such liquid crystal material as operationally nematic liquid crystal.

17. The polarizer of claim 14, further comprising forming an emulsion of such liquid crystal material and pleochroic dye in a containment medium thereby to form plural volumes of liquid crystal material with pleochroic dye in such containment medium.

18. The polarizer of claim 13, the process by which said polarizer is made further comprising curing such cast material to retain a generally elongate shape of volumes therein.

19. The polarizer of claim 13, the process by which said polarizer is made further comprising allowing such cast material to cure to retain a generally elongate shape of volumes therein.

20. The polarizer of claim 13, wherein said liquid crystal material has low birefringence characteristics.

21. The polarizer of claim 20, wherein pleochroic dye is included with the liquid crystal, and said casting comprises casting an emulsion of liquid crystal, pleochroic dye and containment medium.

22. The polarizer of claim 13, said casting comprising casting such emulsion of liquid crystal, and containment medium.

23. The polarizer of claim 22, wherein pleochroic dye is included with the liquid crystal, and said casting comprises casting an emulsion of liquid crystal, pleochroic dye and containment medium.

24. The polarizer of claim 13, further comprising final curing such cast material subsequent to said stretching step.

25. A liquid crystal polarizer as set forth in claim 13, comprising selecting the liquid crystal material to respond to a prescribed input to change structural alignment for affecting polarization of light as a function of such alignment.

* * * * *